United States Patent [19]

Brown et al.

[11] 4,122,709
[45] Oct. 31, 1978

[54] DIGITAL TORQUE METER

[75] Inventors: Winthrop K. Brown, Bellaire; James R. Bridges; Kerry D. Savage, both of Houston, all of Tex.

[73] Assignee: Texaco Inc., New York, N.Y.

[21] Appl. No.: 794,284

[22] Filed: May 5, 1977

[51] Int. Cl.² .............................................. G01L 3/10
[52] U.S. Cl. .................................. 73/136 A; 324/83 D
[58] Field of Search ..................... 73/136 A; 324/83 D

[56] References Cited

U.S. PATENT DOCUMENTS

| | | | |
|---|---|---|---|
| 3,640,131 | 2/1972 | Turk | 73/136 A |
| 3,982,190 | 9/1976 | Schaefer | 324/83 D X |
| 4,020,685 | 5/1977 | Van Millingen et al. | 73/136 A |
| 4,025,848 | 5/1977 | Delagrange et al. | 324/83 D |

*Primary Examiner*—Charles A. Ruehl
*Attorney, Agent, or Firm*—Thomas H. Whaley; Carl G. Ries; Ronald G. Gillespie

[57] ABSTRACT

A torque meter for measuring the torque of a rotating shaft includes at least two sensing devices providing pulses corresponding to the rotation of the shaft. A pulse source provides clock pulses. A circuit receiving th pulses from the sensors and the clock pulses provides groups of clock pulses wherein the number of pulses in each group corresponds to the torque of the shaft.

5 Claims, 1 Drawing Figure

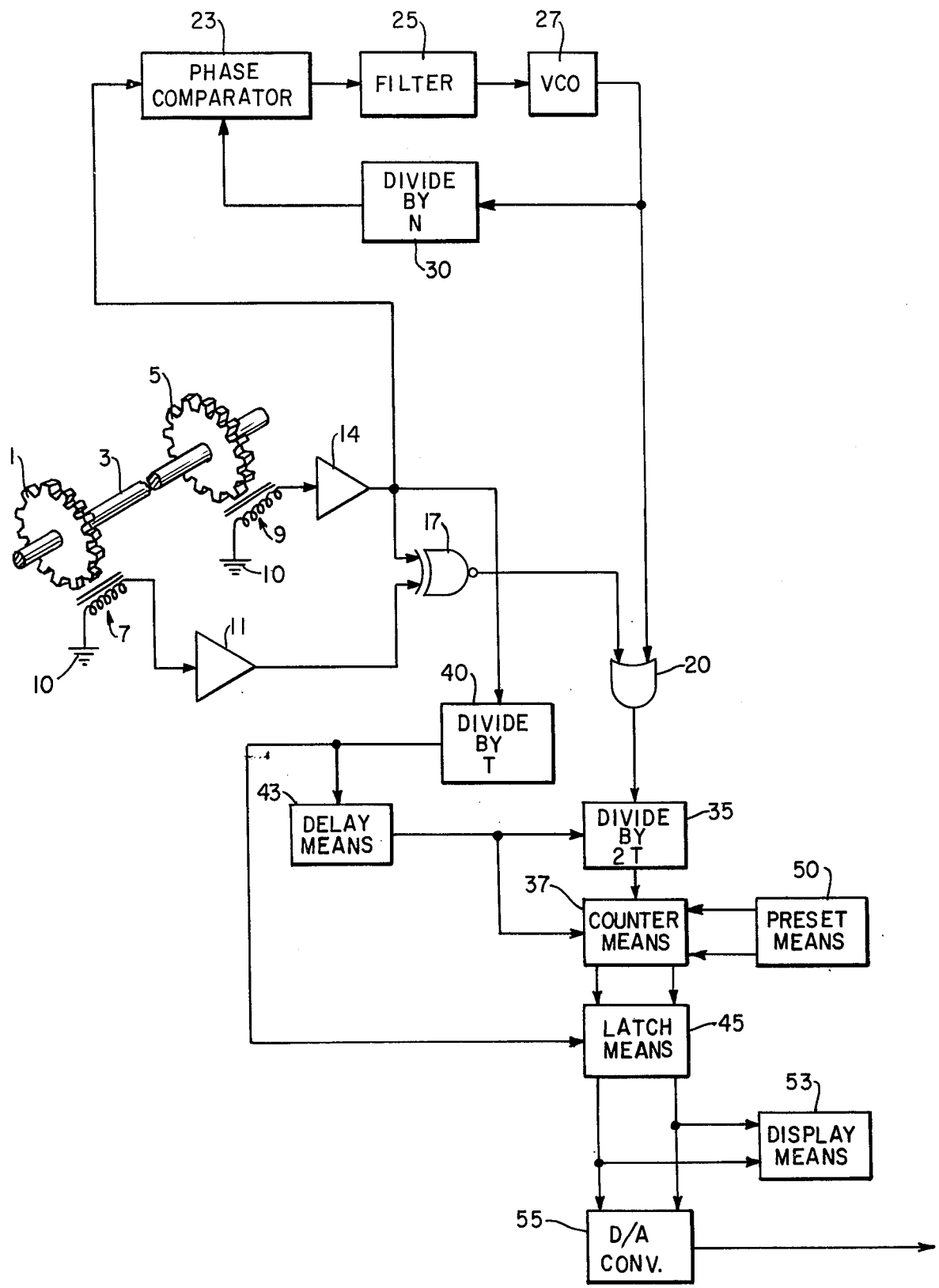

DIGITAL TORQUE METER

BACKGROUND OF THE INVENTION

Field of the Invention

The present invention relates to meters in general and, more particularly, to torque meters.

SUMMARY OF THE INVENTION

A torque meter for measuring a torque on a rotating shaft includes at least two sensors having a predetermined relationship to the shaft and providing shaft pulses at the same frequency but differing in phase, said phase difference corresponding to the torque of the shaft. A clock provides clock pulses having a substantially greater frequency than the frequency of the shaft pulses. A network connected to the sensor and to the pulse source provides groups of clock pulses in accordance with the shaft pulses so that the number of pulses in each group corresponds to the torque of the shaft.

The objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The FIGURE is a simplified block diagram of a torque meter, constructed in accordance with the present invention for measuring the torque in a rotating shaft.

DESCRIPTION OF THE INVENTION

Referring to the FIGURE, there is shown a torque meter having a wheel 1, with teeth, mounted on a shaft 3. At another location on shaft 3, there is mounted another wheel 5 substantially identical to wheel 1. As shaft 3 is rotated, the teeth in wheels 1, 5 pass pick-up coils 7 and 9, respectively, which are connected to ground 10. As each tooth passes a corresponding coil an electric voltage is induced therein so that during rotation of shaft 3, coils 7 and 9 provide pulses.

The pulses from coils 7, 9 are applied to squaring amplifiers 11 and 14, respectively. Squaring amplifiers 11 and 14 may be omitted if the pulses provided by coils 7, 9 are suitable. The outputs from squaring amplifiers 11, 14 are applied to an exclusive NOR gate 17.

When amplifiers 11, 14 are simultaneously providing a pulse, exclusive NOR gate 17 provides a high logic level output. When one and only one of the amplifiers 11 or 14 is not providing a pulse, exclusive NOR gate 17 provides a low logic level output. If both 11 and 14 are not providing a pulse exclusive NOR gate 17 produces a high output. Thus, the duration of a low output from exclusive NOR gate 17 corresponds to the torque. The output from exclusive NOR gate 17 is applied to an OR gate 20.

The output from squaring amplifier 14 is applied to a phase lock-loop comprising a phase comparator 23 providing a voltage to a filter 25 which provides a filtered voltage to a voltage controlled oscillator 27. The voltage provided by comparator 23 corresponds to the phase difference between the pulses from amplifier 14 and other pulses applied to comparator 23, as hereinafter explained. Oscillator 27 provides a plurality of clock pulses whose frequency is determined by the voltage applied to oscillator 27. The clock pulses are provided to a 'divide by N' divider 30 whose pulses are applied to phase comparator 23. In operation oscillator 27 provides the clock pulses at a frequency N times greater than the frequency of the pulses provided by squaring amplifier 14.

The clock pulses from oscillator 27 are provided to OR gate 20. OR gate 20 provides an output to a 'divide by 2 T' divider 35 where T is the number of teeth on either wheel 1 or 5. The operation of exclusive NOR gate 17 and OR gate 20 is such that while amplifiers 11 and 14 simultaneously are providing pulses, the high output from NOR gate 17 in effect blanks out the clock pulses from oscillator 27. When one of the amplifiers 11, 14, does not provide a pulse, while the other amplifier is providing a pulse, OR gate 20 provides pulses to divider 35. The pulses from divider 35 are provided to counter means 37 for counting.

The pulses from amplifier 14 are applied to a 'divide by T' divider 40 which in effect provides a pulse for every complete rotation of wheel 5. The pulses from divider 40 are applied to delay means 43 and to latch means 45. Delay means 43 provides a delayed pulse to divider 35 and to counter means 37. The leading edge of the delayed pulse resets divider 35 and counter means 37 while the trailing edge loads counter means 37 with digital signals provided by pre-set means 50.

The output of latc means 45 is applied to display means 53 and to a digital-to-analog converter 55 which provides an analog signal corresponding to the torque.

The invention hereinbefore described is a digital torque meter for measuring the torque on a rotating shaft. The torque is determined by developing two signals whose difference in phase corresponds to the torque experienced by the shaft. The phase difference is then used to generate pulses corresponding in number to the toraue. The pulses are then counted, displayed and recorded.

What is claimed is:

1. A torque meter for measuring the torque of a rotating shaft comprising at least two sensing means affixed to the shaft and providing shaft pulse signals at the same frequency but having a phase difference corresponding to the torque of the shaft, each sensing means includes a wheel mounted on the shaft having T number of teeth, and coil means placed adjacent to the wheel for providing a pulse each time a tooth on the wheel passes the coil means; clock pulse means for providing clock pulses, said clock pulse means includes phase comparator means connected to one of the coil means and receiving its shaft pulse signal, first divider means connected to the phase comparator means for providing pulses at a rate of one pulse for every N pulses it receives, said phase comparator means providing a voltage output in accordance with the phase comparison, means for filtering the voltage from the phase comparator means to provide a filtered voltage, and a voltage-controlled oscillator connected to the filter means and to the first divider means for providing the clock pulses in accordance with the filtered voltage to the first divider means; and circuit means connected to the two coil means and to said clock pulse means for providing groups of clock pulses in accordance with the shaft pulses so that the number of clock pulses in each group corresponds to the torque of the shaft, said circuit means includes an exclusive NOR gate connected to the coil means for providing a low logic level signal when the shaft pulse signals are not at substantially the same amplitude and for providing a high logic level signal when the shaft pulse amplitudes are substantially the same, and an OR gate connected to the exclusive NOR gate and to the voltage controlled oscillator for providing the groups of clock pulses in accordance with the signal from the exclusive NOR gate.

2. A torque meter as described in claim 1 further comprising second divider means for dividing the number of pulses in each group of pulses from the OR gate by twice the number of teeth on a wheel, third divider means connected to one of the coil means for dividing the number of pulses in the shaft pulse signal by T so as to provide a pulse per revolution of the shaft, delay means connected to the third divider means for delaying the pulse from the third divider means to provide a delayed pulse to the second divider means, counter means connected to the second divider means and to the delay means for being periodically reset by the delayed pulse and for counting the number of pulses provided by the second divider means, latch means connected to the counter means and to the third divider means for storing the signal from the counter means in response to the pulse from the third divider means so as not to change while the counter means is counting and for providing digital signals corresponding to the stored signals.

3. A torque meter as described in claim 2 further comprising a digital to analog converter connected to the latch means for converting the digital signals to an analog signal.

4. A torque meter as described in claim 3 further comprising display means connected to the latch means for providing a display corresponding to the torque of the shaft in accordance with the digital signals from the latch means.

5. A torque meter as described in claim 4 in which the counter means includes a counter connected to the second divider means and to the delay means for counting pulses from the second divider means and being reset by the delayed pulse to provide digital signals corresponding to the count, and present means for presetting a count into the counter corresponding to a known alignment error between the two wheels.

* * * * *